June 11, 1968    P. D. GEORGE    3,387,515
MODULAR LATHES

Filed Dec. 27, 1966    4 Sheets-Sheet 1

INVENTOR.
PETER D. GEORGE

BY Morse, Altman & Oates

ATTORNEYS

June 11, 1968 P. D. GEORGE 3,387,515

MODULAR LATHES

Filed Dec. 27, 1966

INVENTOR.
PETER D. GEORGE
BY
Morse, Altman & Oates
ATTORNEYS

June 11, 1968 P. D. GEORGE 3,387,515
MODULAR LATHES

Filed Dec. 27, 1966 4 Sheets-Sheet 3

INVENTOR.
PETER D. GEORGE
BY Morse, Altman & Oates
ATTORNEYS

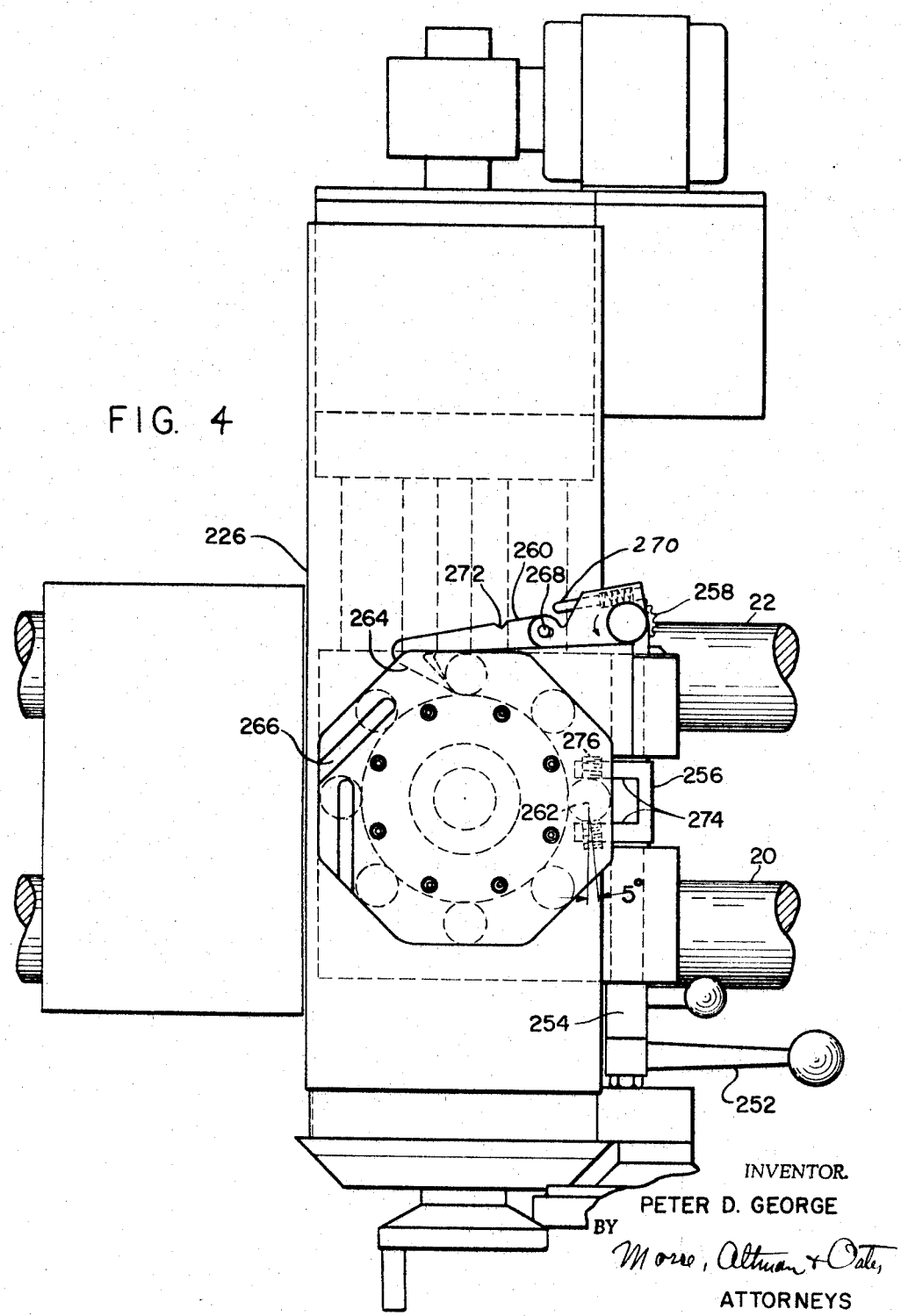

United States Patent Office 3,387,515
Patented June 11, 1968

3,387,515
MODULAR LATHES
Peter D. George, 156 Crabtree Road,
Quincy, Mass. 02169
Continuation-in-part of application Ser. No. 367,720,
May 15, 1964. This application Dec. 27, 1966, Ser.
No. 604,389
10 Claims. (Cl. 82—2)

ABSTRACT OF THE DISCLOSURE

A turret indexing assembly is provided for use with lathes and the like to permit quick and precise movement of tools successively into cutting position. The turret is rotatably mounted on a carriage and is adapted to support cutting tools at evenly spaced angular positions. The head is provided with spherical elements which cooperate with a bifurcated yoke movable into and out of locking position with each of the spherical elements and adapted to center each tool with respect to the workpiece. A latch is provided and cooperates with the yoke to index the head from one position to the next.

---

This application is a continuation-in-part of my U.S. application Ser. No. 367,720, filed May 15, 1964, and now abandoned.

This invention relates generally to lathe machinery and more particularly is directed towards a lathe base support and driving head in cooperation with a variety of interchangeable modules adapted to perform selected machining operations. This invention is also directed towards improvements in lathe components.

A lathe generically defines a machine adapted to remove metal from a workpiece by gripping it securely in a clamping device and rotating it under power against a suitable cutting tool. Lathes are able to perform a number of machining operations such as facing, boring and threading, and, depending upon the design of the machine, these operations may be carried out under manual, semi-automatic or completely automatic control. While machines of this type generally are quite versatile as a class, a specific lathe unit is relatively restricted as to its range of operations. For this reason, machine shops normally require several individual lathe machines, each adapted to perform certain machining operations for which each machine is particularly designed. Since each machine is a relatively expensive piece of equipment, a sizable capital outlay is required to properly outfit a machine shop.

Accordingly, it is a general object of the present invention to provide improvements in lathe machines.

Another object of this invention is to provide a basic lathe unit adapted to accommodate a variety of interchangeable modules for performing a variety of different machining operations.

Still another object of this invention is to provide a lathe machine which is readily convertible from one mode of operation to another.

A still further object of this invention is to provide a lathe machine with cooperating modules which may function on a manual, semi-automatic or completely automatic basis.

More particularly, this invention features a lathe comprising a basic driving head and cylindrical ways of hardened metal on which are selectively mounted interchangeable modules each adapted to perform one or more selected operations such as threading, boring, or the like. Certain ones of the modules may be programmed to cycle automatically and perform selected predetermined operations on a completely automatic basis. Other modules may be employed for semi-automatic operation while further modules may be operated manually for use in producing individual parts not suitable for automatic production.

Figure 1:
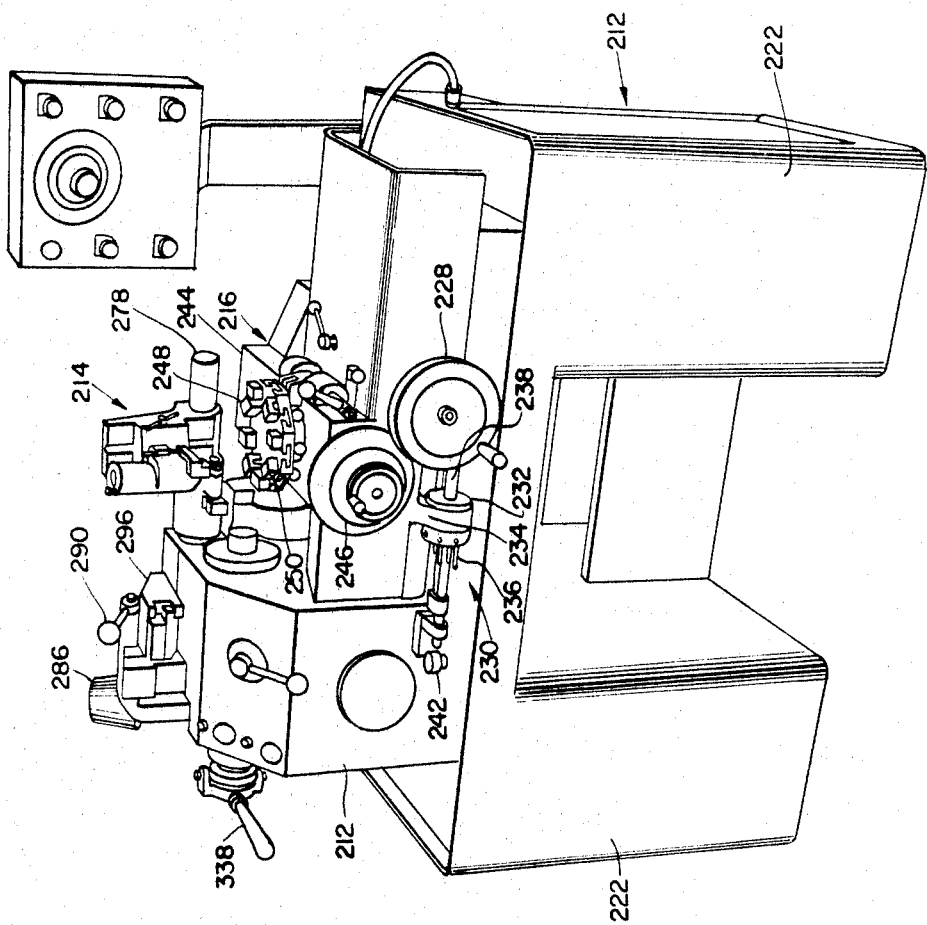
Figure 2:
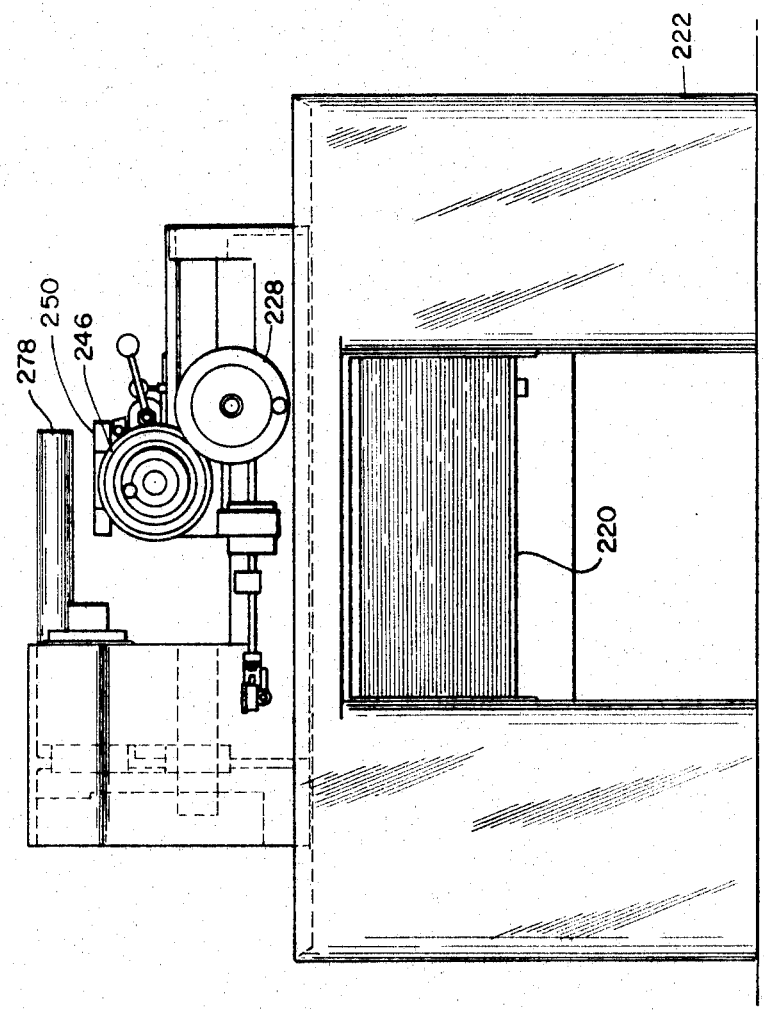
Figure 3:
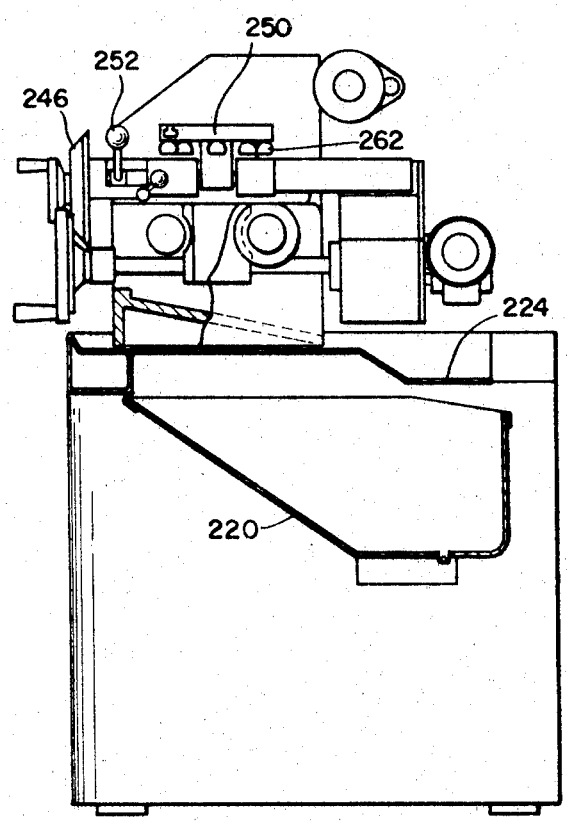

But these and other features of the invention, along with further objects and advantages thereof, will become more fully apparent from the following detailed description of preferred embodiments of the invention, with reference being made to the accompanying drawings in which:

FIG. 1 is a view in perspective of a lathe base and drive unit with a modular chucking unit attached thereto, FIG. 2 is a view in front elevation of the FIG. 1 device, FIG. 3 is a view in end elevation, and FIG. 4 is a fragmentary top plan view showing the advance mechanism for the chucker.

Referring now to FIGS. 1 through 4, there is illustrated a lathe base 212 having a conventional spindle adapted to accommodate a threading attachment module 214 and a chucker module 216. The entire machine is mounted on a table which features a pivotally mounted bin 220 disposed between two base legs 222. The bin 220 is open at the top to receive chips and other waste which drops down through a funneled opening 224 in the top rear portion of the table. It will be understood that a wedge-shaped slide or baffle directs the chips and coolants, etc., rearwardly of the machine so that they will fall down into the funnel opening to the bin 220 where they will accumulate. When the bin 220 becomes filled, it may be tilted forwardly and downwardly into a suitable receptacle, emptied and then returned to the raised position shown in FIG. 3.

The chucker module 216 is generally organized about a carriage 226 mounted for movement along the hardened cylindrical ways 20 and 22. Movement of the carriage along the ways is controlled by means of a hand wheel 228 in mesh with a rack (not shown) extending parallel to the ways. The movement of the carriage along the ways may be limited in the direction of the motor housing by means of an adjustable stop mechanism 230 whereby the depth of a particular cut or boring may be selectively controlled by the operator. The stop mechanism includes a barrel 232 rotatably mounted to the front of the machine by means of a bracket 234 and carrying a plurality of stop rods 236. The stop rods are arrayed in a circle about the axis of the barrel and each is of a different length. The bracket 234 moves with the carriage and the barrel is guided along a rod 238 mounted to the base of the machine. A stop 240 is adjustably mounted along the rod 238 and in the path of travel of one of the stop rods 236. By rotating the barrel to a selected position cuts of different depths may be made. A micrometer indicator 242 is provided at the end of the rod 238 for precise control over the depth of the cut.

Mounted on top of the carriage 226 is a cross slide 244 controlled by means of a hand wheel 246 for moving the slide back and forth transversely of the carriage. On top of the slide there is mounted a turret head 248 provided with a plurality of tool holding pieces 250 each of which may be indexed into a cutting position.

Referring more particularly to FIG. 4, the indexing mechanism of the turret head 248 will be described in detail. This indexing mechanism includes a lever 252 which operates a shaft 254 extending tangentially below the turret head and carrying a bifurcated lock device 256 at its mid portion and a gear 258 at its end portion adapted to pivot an articulated latch 260. By pulling down on the lever 252, the lock 256 will first disengage one of a series of fixed balls 262 evenly spaced about the turret head and, when the lock is disengaged, the latch 260 will pull against the turret head and index it into a new position. It will be noted that the outer end of the latch 260 is formed with a bent finger 264 for engagement with a ball 262 or the like. As the latch is pulled to an extreme position and then released, the finger 264 will disengage from its ball upon release of the arm 252 to return to its normal position shown in FIG. 4 where it will engage the next ball 262.

It will be noted that the latch is hinged at 268 so that it may swing about this point when its gear engaging end is rotated under the action of the gear 258. This end of the latch is also provided with a spring loaded pin 270 adapted to engage with a notch 272 when the latch is in a fully retracted position. This arrangement will urge the finger portion of the latch to remain inwardly to insure engagement of the finger when it moves from one ball to the next during rotation of the turret head.

The bifurcated lock 256 is formed with a pair of spaced legs 274 which span either side of a ball 262 when in a locking position. Adjustable set screws 276 are provided in each of these legs to bear against a ball 262 in locking engagement therewith. One of the set screws is disposed at a slight angle, typically 5°, from alignment with the other set screw to provide a wedging action for the ball 262 when in a locking position. Use of the set screws provides a convenient means for insuring precise alignment of each turret in the head as it is indexed from one position to the next.

While the invention has been described with particular reference to the illustrated embodiments, it will be understood that numerous modifications thereto will appear to those skilled in the art. Also, it will be understood that the above description and accompanying drawings should be taken as illustrative of the invention and not in a limiting sense.

Having thus described the invention, what I claim and desire to obtain by Letters Patent of the United States is:

1. A turret assembly for a lathe, comprising means mounting said assembly to said lathe, a turret head rotatably mounted to said mounting means, a plurality of tool supporting members evenly spaced about said head, a like number of spherical elements evenly distributed about said head, a rod carried by said mounting means and extending in spaced generally tangential relation to said head, an arm fixed to said rod, a bifurcated yoke fixed to said rod and adapted to be moved into and out of locking engagement with one of said elements upon biasing of said arm in one direction and latch means connected to said rod and engageable with said head for indexing said head upon biasing of said arm in another direction.

2. A chucking lathe, comprising, in combination, a base, horizontal ways mounted to said base, a carriage mounted for longitudinal movement along said ways, a lathe spindle mounted to said base, means for moving said carriage selectively to and away from said lathe spindle, a turret head rotatably mounted to said carriage, a plurality of tool supporting members evenly spaced about said head, a like number of spherical elements evenly distributed about said head, a rod extending in spaced generally tangential relation to said head, an arm fixed to said rod, a bifurcated yoke fixed to said rod and adapted to be moved into and out of locking engagement with one of said elements upon biasing of said arm in one direction and latch means operatively connected to said rod and engageable with said head for indexing said head upon biasing of said arm in another direction.

3. A chucking lathe according to claim 2 including means for moving said head transversely of said ways.

4. A chucking lathe according to claim 2 included variable stop means between said carriage and said base for selectively controlling the longitudinal movement of said carriage to and away from said lathe spindle.

5. A turret assembly for a lathe, comprising a carriage adapted for horizontal movement, a turret head rotatably mounted to said carriage, a plurality of tool supporting members evenly spaced about said head, a like number of spherical elements fixed to and evenly distributed about said head, a yoke element movably mounted to said carriage, a levered rod for moving said yoked element into and out of cooperating locking engagement with one of said spherical elements and an articulated latch for indexing said head upon disengagement of said yoked element from said spherical element.

6. A turret assembly according to claim 5 including a set screw mounted to each leg of said yoked element in position to have the opposing ends thereof engage opposite sides of one of said spherical elements received in said yoked element.

7. A turret assembly for a lathe, comprising a carriage adapted for horizontal movement, a turret head rotatably mounted to said carriage, a plurality of tool supporting members spaced about said head, a plurality of spherical elements spaced about said head, a yoked element movably mounted to said carriage, a levered rod for moving said yoked element into and out of cooperating locking engagement with one of said spherical elements in register therewith, a set-screw mounted to each leg of said yoked element in position to have the opposing ends thereof engage opposite sides of one of said spherical elements received in said yoked element.

8. A turret assembly according to claim 7 wherein said set-screws are mounted at an obtuse angle with respect to one another about the center of a spherical element when in locking position, the opposing ends of said screws receiving said spherical element in wedging engagement.

9. A turret assembly according to claim 8 wherein said angle is approximately 85°.

10. A turret assembly for a lathe, comprising a carriage, a turret head rotatably mounted to said carriage, a plurality of tool supporting members spaced about said head, a plurality of spherical elements spaced about said head, a yoked element movably mounted to said carriage, means for moving said yoked element into and out of cooperating locking engagement with one of said spherical elements in register therewith, a set-screw mounted to each leg of said yoked element in position to have the opposing ends thereof engage opposite sides of one of said spherical elements received in said yoked element, said set screws being disposed at an obtuse angle with respect to one another about the center of a spherical element when in locking position, the opposing ends of said screws receiving said spherical element in wedging engagement.

References Cited

UNITED STATES PATENTS 2,086,849  7/1937  Bullard et al. _____ 74—815 XR

LEONIDAS VLACHOS, *Primary Examiner.*